(No Model.) 5 Sheets—Sheet 1.
G. J. ALTHAM.
POWER TRANSMITTING MECHANISM.
No. 599,545. Patented Feb. 22, 1898.
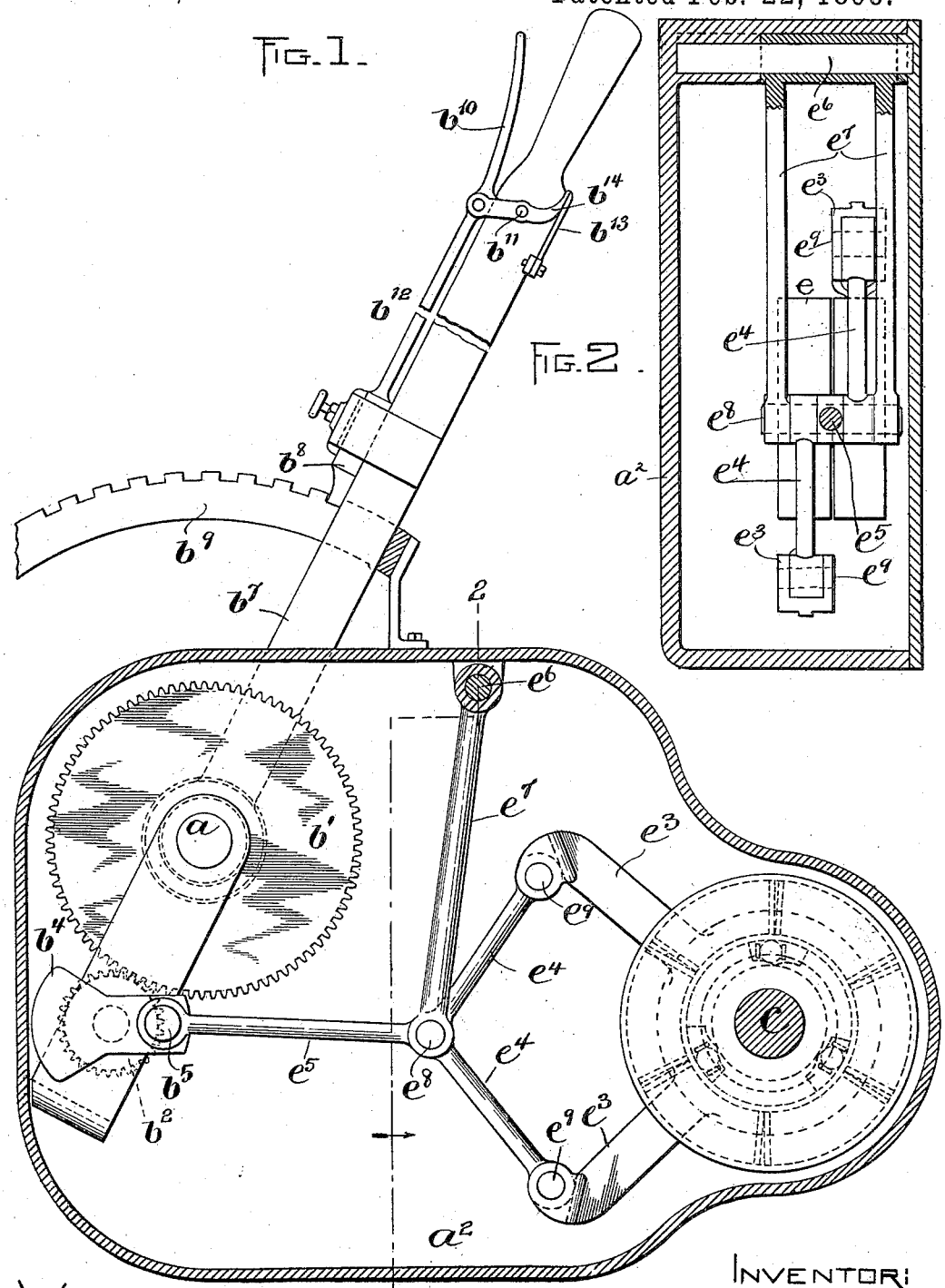
WITNESSES:
INVENTOR:

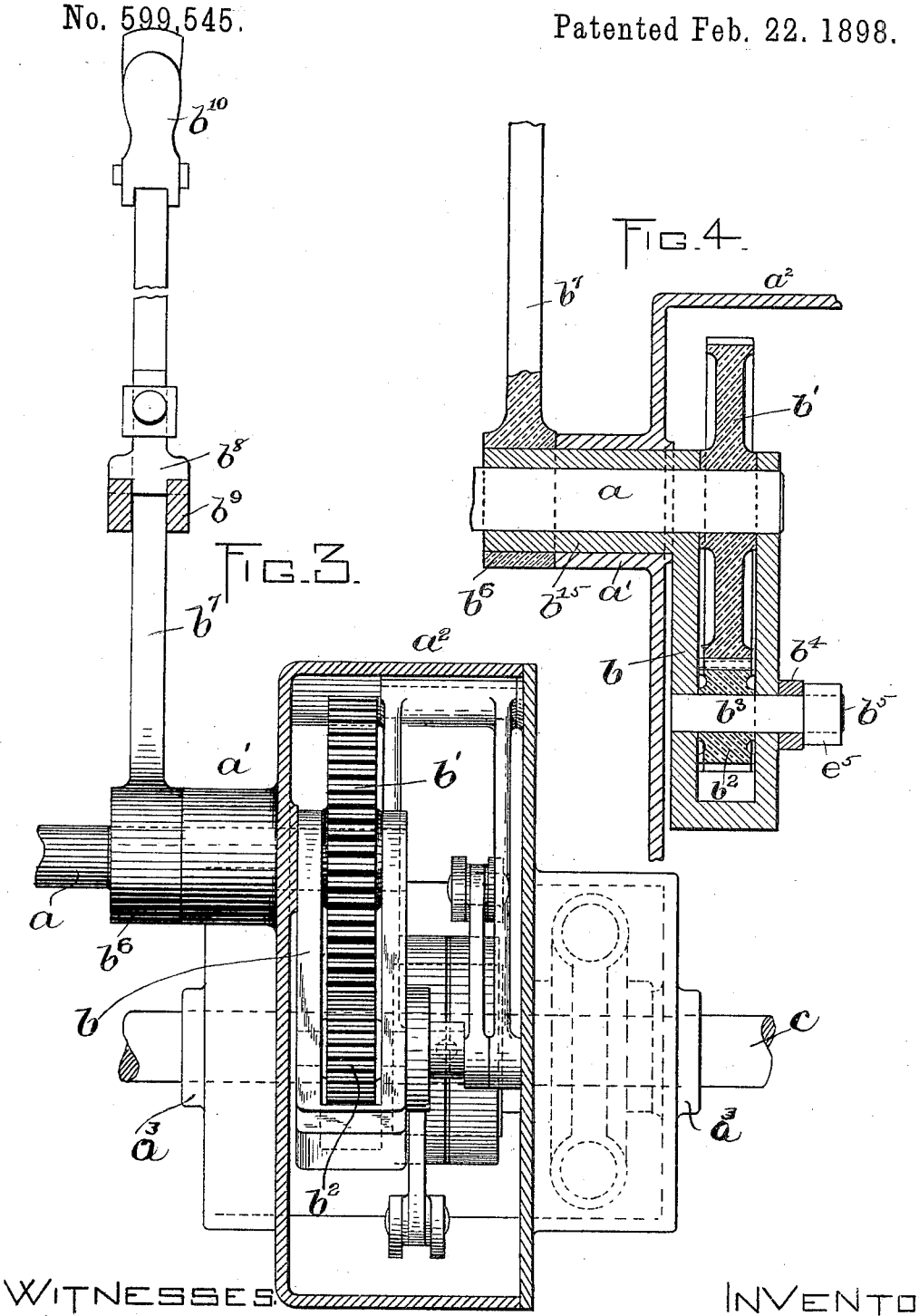

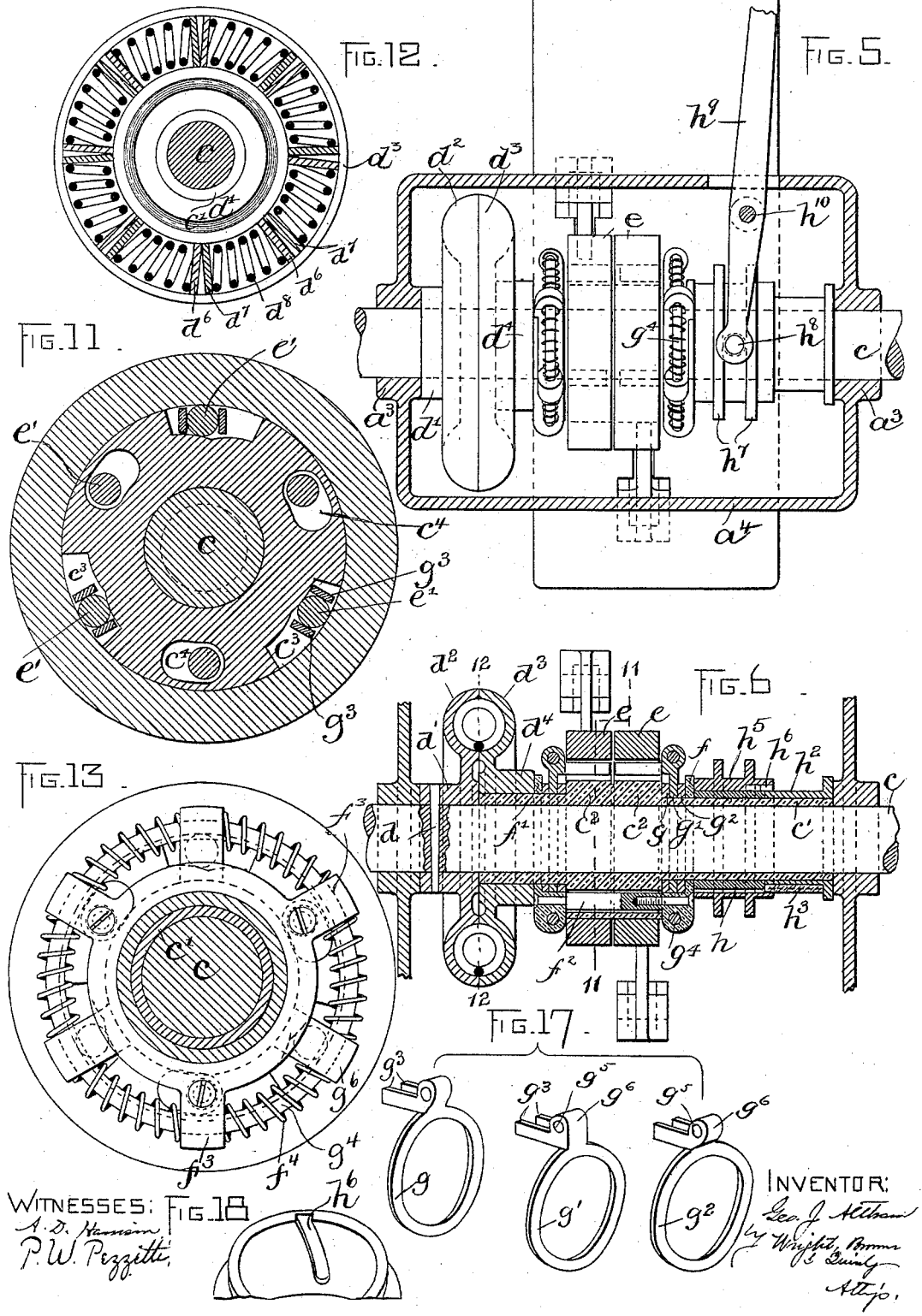

(No Model.) 5 Sheets—Sheet 4.
G. J. ALTHAM.
POWER TRANSMITTING MECHANISM.
No. 599,545. Patented Feb. 22, 1898.
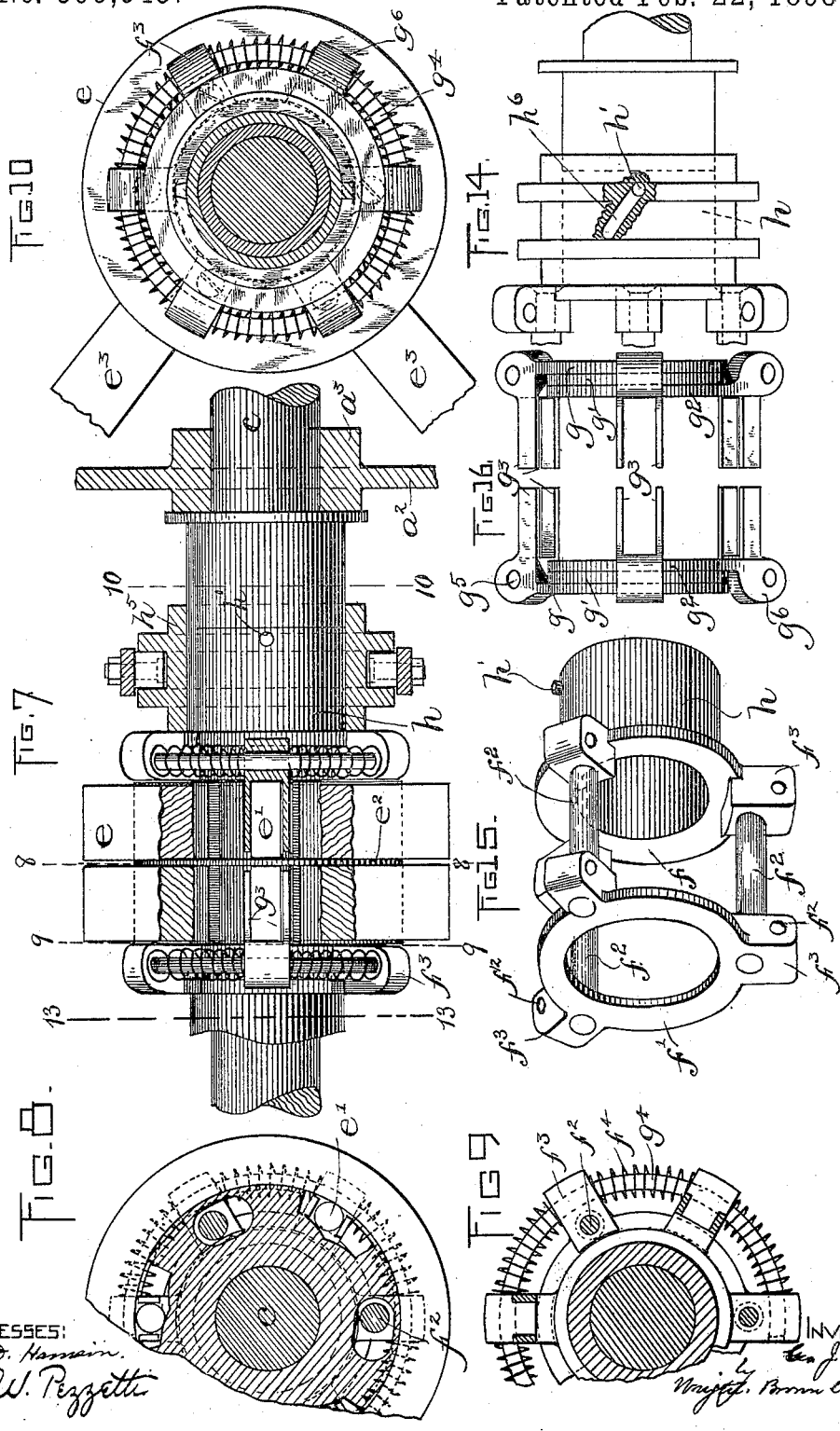

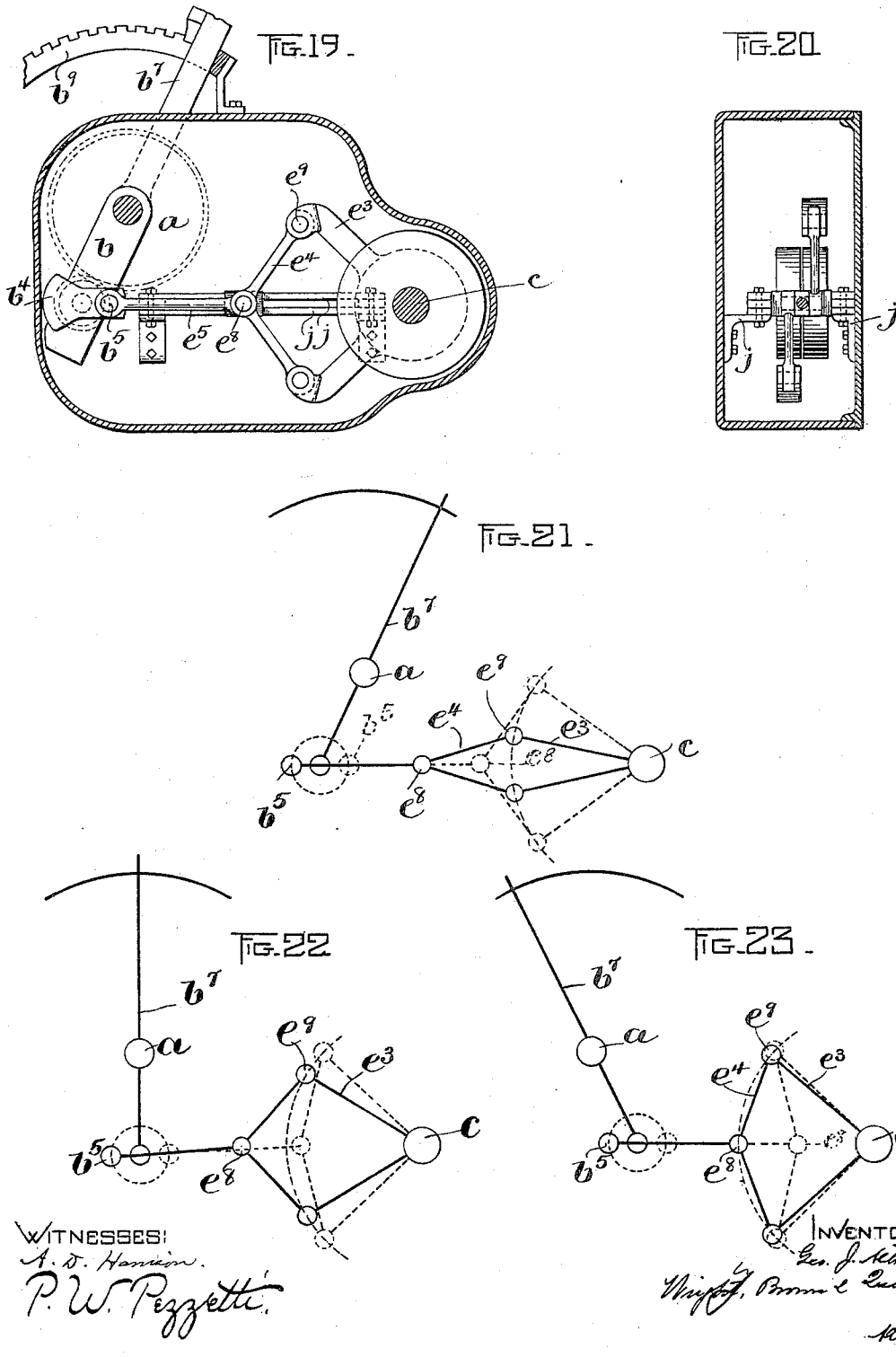

UNITED STATES PATENT OFFICE.

GEORGE J. ALTHAM, OF FALL RIVER, MASSACHUSETTS.

POWER-TRANSMITTING MECHANISM.

SPECIFICATION forming part of Letters Patent No. 599,545, dated February 22, 1898.

Application filed April 17, 1897. Serial No. 632,627. (No model.)

*To all whom it may concern:*

Be it known that I, GEORGE J. ALTHAM, of Fall River, in the county of Bristol and State of Massachusetts, have invented certain new and useful Improvements in Power-Transmitting Mechanism, of which the following is a specification.

This invention has relation to power-transmitting mechanism, and is principally designed for the purpose of transmitting power from the shaft of a gas or oil motor to the axial shaft of a motor-vehicle.

I have found that a gas or oil motor is best adapted for use on a motor-vehicle by reason of its lightness and the small amount of fuel required to be carried for running it, and for various other reasons to which it is unnecessary now to refer, and when such engines are employed it is desirable that it should not be necessary to stop or start them or change the speed thereof in controlling the vehicle. Hence the prime object of this invention is to transmit the power from the continuously-rotating engine-shaft to the driven shaft in such way that the last-mentioned shaft may be stopped or started and have its speed changed from zero or minimum to maximum, and be reversed, if desired, without affecting the rotation of the engine or power shaft.

To these ends the invention consists of a power-transmitter embodying those features of construction and arrangement which are illustrated upon the drawings, and which I shall now proceed to describe in detail and then point out in the claims hereto appended.

Reference is to be had to the accompanying drawings, and to the letters marked thereon, forming a part of this specification, the same letters indicating the same parts or features, as the case may be, wherever they occur.

Of the drawings, Figure 1 represents the form of transmitter which I have elected to illustrate as embodying my invention. Fig. 2 represents a vertical transverse section, taken on the line 2 2 of Fig. 1, looking in the direction of the arrow. Fig. 3 represents an end elevation of the apparatus with the casing which surrounds it broken away. Fig. 4 represents in section the hanger which is mounted on the end of the driving-shaft, the gear-wheel on the said shaft, and the pinion for driving the crank from which power is transmitted to the clutches on the driven shaft. Fig. 5 represents a plan view of the driven shaft, the casing being illustrated in section. Fig. 6 represents a horizontal section through the shaft and the parts which are mounted thereon. Fig. 7 represents an enlarged view of the driven shaft with the oscillatory clutch members partially broken away. Fig. 8 represents a cross-section on the line 8 8 of Fig. 7. Fig. 9 represents a section on the line 9 9 of Fig. 7, looking in the direction of the arrow. Fig. 10 represents a section on the line 10 10 of Fig. 7. Fig. 11 represents a section on the line 11 11 of Fig. 6. Fig. 12 represents a section on the line 12 12 of Fig. 6. Fig. 13 represents a section on the line 13 13 of Fig. 7. Fig. 14 illustrates the sleeve for operating the clutch-spiders. Fig. 15 is a perspective view of the spider. Figs. 16 and 17 represent the rings which are secured in the spider. Fig. 18 is a perspective view of the sleeve shown in Fig. 14. Figs. 19 and 20 show a slightly-different form of the transmitter. Figs. 21 to 23, inclusive, are diagrams illustrative of the movement of the clutches.

In illustrating my invention I have not deemed it necessary to show either the carriage or the motor which is employed thereon, but have merely shown two shafts, which are designated as the "power" or "driving" shaft and the "driven" shaft, and it will be understood that these shafts may be the shaft of the motor itself and the shaft on which the wheels are placed or the shafts intermediate thereof.

The driving-shaft, which is indicated at $a$, extends into the journal-bearing $a'$, formed on the side of a casing $a^2$, into which the shaft projects. The casing is of the shape indicated in Figs. 1, 2, 3, and 5, although this particular shape is not essential.

Between the journal-bearing $a'$ and the shaft $a$ is placed the sleeve or hub $b^{15}$ of a hanger $b$, which is U-shaped, as shown in Fig. 4. Between the two arms of the hanger is placed a large gear-wheel $b'$, rigidly secured to the shaft $a$, and intermeshing with a pinion $b^2$, secured to a shaft $b^3$, mounted in the hanger and projecting forward therefrom. The shaft $b^3$ is provided with a crank-arm $b^4$, out from one end of which a crank-pin $b^5$ extends, the other end of the crank-arm being weighted.

To the sleeve $b^{15}$ is rigidly secured the hub of a hand-lever $b^7$, so that by swinging the lever around the shaft $a$ as a fulcrum the position of the hanger may be changed, as desired, without affecting the operative relationship of the gear-wheel $b'$ and the pinion $b^2$. The hanger may be held in any desired position by a latch $b^8$, adapted to enter any one of a series of notches in a segment-rack $b^9$, the latch being drawn out from engagement with the notches by a thumb-lever $b^{10}$, fulcrumed at $b^{11}$, and connected to the latch by a rod $b^{12}$, which may, if desired, be an extension of the latch itself. A spring $b^{13}$ presses against the end $b^{14}$ of the thumb-lever $b^{10}$, so as to hold the latch $b^8$ normally in one of the notches in the rack-bar. The lever extends up to the reach of the person who is guiding the vehicle, and may be placed in any desired position.

The driven shaft, which is indicated at $c$, is mounted in bearings $a^3$ $a^3$ in the barrel-like or cylindrical end $a^4$ of the casing $a^2$. Upon this shaft are placed the driving-wheels of the vehicle, or else it is connected to the shaft upon which the said wheels are placed. Between the bearings $a^3$ upon the shaft $c$ is placed a sleeve $c'$, which is yieldingly connected to the shaft by means which I shall now describe.

Rigidly secured to the shaft $c$ by a tapering pin $d$ is the hub $d'$ of a disk $d^2$, which is provided with an annular or concentric groove semicylindrical in cross-section, and confronting this disk $d^2$ is a similar disk $d^3$, whose hub $d^4$ is rigidly secured to the end of the sleeve $c'$.

The disk $d^3$ and the disk $d^2$ form a circular concentric groove, and they are provided with projecting webs or stops $d^6$ $d^7$, which overlap each other, as shown in Fig. 12, and between which are placed cushioning-springs $d^8$. Now then it will be seen that while the sleeve $c'$ is secured to the shaft $c$, so as to cause it to turn therewith, yet at the same time it is capable of a slight movement relatively thereto by reason of the resiliency of the springs $d^8$. Hence by imparting motion to the sleeve it will be transmitted to the shaft, and even though the movement of the said sleeve may be slightly irregular the springs $d^8$ will cause it to be transmitted to the shaft in such way that the movements of the shaft will be regular and even within the limit of the cushioning power of the said springs.

For the purpose of imparting a rotary movement to the sleeve I employ clutches operated from the crank-pin $b^5$, as I shall now proceed to describe.

The sleeve $c'$ is formed with enlarged flanges $c^2$, which constitute driven clutch members, and placed upon them are two rings $e$ $e$, which constitute driving clutch members. The driven clutch members $c^2$ $c^2$ are each recessed to provide double wedge-shaped apertures $c^3$, as shown in Fig. 11, and in the apertures are placed clutch-rolls $e'$. The walls of each cavity are doubly eccentric, so that if the said rolls are moved to one end of the cavity the clutch member $c^2$ will be driven in one direction and if shifted to the other side of the cavity it will be driven in the opposite direction. The rolls are held from longitudinal movement by a ring $e^2$, as is more particularly shown in Fig. 7. When the clutch-rolls $e'$ are in a position substantially halfway between the ends of the cavities $c^3$, they are inoperative, and though the driving clutch members be operated they will affect no movement of the driven members. The driving clutch members $e$ $e$ are provided with oppositely-extending arms $e^3$, as shown in Fig. 1, connected together by toggle-links $e^4$ $e^4$, the pivot $e^8$ connecting the said links being connected to the crank-pin $b^5$ by a connecting-rod $e^5$ and being also connected to a stationary pivot $e^6$ by a connecting-rod $e^7$. Now it is apparent that when the crank is revolved through the medium of the pinion $b^2$ and the large gear-wheel $b'$ it will cause the opposite oscillation of the arms $e^3$ $e^3$ and a corresponding opposite oscillation of the driving clutch members $e$, so that when the crank-pin $b^5$ is moving toward the shaft $c$ one of the driving clutch members is locked to one of the driven clutch members, so as to move the sleeve $c'$ and the shaft $c$ with it for a portion of a revolution, and when the crank-pin is moving in the opposite direction the other clutch member will be actuated and locked to its coacting driven clutch member $c^2$ to carry the sleeve $c'$ still farther around, this successive operation of the two clutches causing finally a complete rotation of the shaft $c$.

For the purpose of shifting the clutch-rolls $e'$ I provide a spider, as shown in Fig. 15, consisting of two rings $f$ $f'$, connected together by rods $f^2$, passing through elongated apertures $c^4$ in the driven clutch members of the sleeve. At each end of the spider are three rings $g$ $g'$ $g^2$, each of which is provided with two inwardly-projecting fingers $g^3$ $g^3$, which lie on either side of one of the clutch-rolls $e'$, there being a ring for each roll. A ring $g^4$ is passed through eyes $g^5$ in lugs $g^6$ of the rings and through eyes $f^{12}$ in lugs $f^3$ of the rings $f$ $f'$ of the spider, and springs $f^4$ are coiled about the said ring $g^4$ and have their ends abutting against the lugs $f^3$ and the lugs $g^6$, so that the said rings $g$ $g'$ $g^2$ are yieldingly connected to the spider. Hence by partially rotating the spider in one direction or the other the clutch-rolls may be shifted from one operative position to the other to reverse the direction of movement or cause a cessation of movement of the sleeve $c'$ and the shaft $c$, as will be readily understood. For causing this partial rotation of the spider the ring $f$ is provided with an outwardly-projecting hub $h$, having a pin $h'$, the said hub or sleeve $h$ being loose relative to the sleeve $c'$. The sleeve $h^2$ is of the same diameter as the hub $h$ and is rigidly secured to the sleeve $c'$, being provided with a spline $h^3$, which projects into a groove or keyway in a longitudinal sliding sleeve $h^5$. The said sleeve $h^5$ is provided internally with a spiral groove $h^6$, into which the pin $h'$ projects, and has flanges $h^7$, between which a pin $h^8$ on the end of the hand-lever $h^9$ extends. The hand-lever is pivoted at $h^{10}$ and projects through the casing $h^4$, so as to be reached by a person on the vehicle. By swinging the lever on its fulcrum the sleeve $h^5$ is moved longitudinally, and by reason of its cam-and-slot connection with the hub $h$ of the spider it causes the partial rotation of the spider and a shifting of the clutch-rolls $e'$, as will be understood.

The clutch-shifting rings $g\ g'\ g^2$ are yieldingly connected to the spider for the reason that when one set of clutch-rolls is operating and the lever $h^9$ is shifted it is impossible to unlock the said rolls, although the other set of rolls will be shifted by the movement of the spider, and hence the springs $f^4$ cause the said first-mentioned rolls to be immediately shifted into their other positions as soon as they are released by their driving clutch member being reciprocated in the opposite direction.

In Figs. 19 and 20 a transmitter is shown in which I dispense with the swinging guide or link $e^7$. In this event I provide guides $j\ j$, supported by brackets $j'\ j'$ for the pivot $e^8$, which connects the toggle-levers $e^4\ e^4$ and the rod $e^5$.

The degree of movement of the clutch members may be varied from practically zero or minimum to maximum by shifting the hand-lever $b^7$ and with it the pinion $b^2$ and the crank-arm operated thereby.

Referring to Figs. 21, 22, and 23, I have shown diagrams illustrating how the range of movement of the arms $e^3$ of the driving clutch members may be varied and the speed of the driven shaft $c$ regulated through the movement of the hand-lever. In Fig. 21 the hand-lever is shifted to its limit at the right, so that the arms $e^3$ are oscillated through their greatest arc of movement, as shown by dotted lines, so that the driven shaft is rotated at its greatest maximum speed. In Fig. 22 the hand-lever is shown as occupying a central position, and the arms $e^3$ have a limited oscillation, so as to cause the driven shaft to be rotated at a moderate rate of speed. In Fig. 23, however, the hand-lever is shifted to the extreme of its movement to the left and the arms $e^3$ are separated, so that the pivot $e^8$ has a movement to each side of a line connecting the pivots $e^9$, whereby the arms $e^3$ are practically not oscillated at all, and hence it will be seen that the more acute the angle of the two arms $e^3$ the greater is the oscillation of the said arms and the greater the speed of the driven shaft.

From the foregoing it will be apparent that I have provided a simple and yet highly-efficient mechanism for transmitting the power from a continuously-rotating motor-shaft of a vehicle to the driven shaft. The speed of the driven shaft may be varied at will and may be stopped or reversed without affecting the movement of the driving-shaft.

I claim—

1. A power-transmitter comprising a driven shaft, clutch members on said shaft and having diverging arms, toggle-levers connecting said arms, means for reciprocating the connecting-pivot of the two toggle-levers, means for reversing the operations of the clutch members, and means for varying the position or location in which said pivot reciprocates without varying its extent of movement.

2. A power-transmitter comprising a shaft, oppositely-actuated clutch members thereon, a crank connected to said clutch members, and means for adjusting the pivot of the crank toward and from the driven shaft whereby the crank is bodily adjusted to regulate the degree of movement of the clutch members.

3. A power-transmitter, comprising a shaft, independent clutch members for actuating said shaft, toggle-levers for operating said clutch members, means for reciprocating the pivot of the toggle-levers to actuate the clutch members, and adjusting devices for varying the position but not the extent of movement of the said means to regulate the movement of the clutch members.

4. A power-transmitter comprising a shaft, a clutch member thereon, and having an arm, a crank, two pivoted levers connecting said crank with the arm, a guide for the pivot of the said levers, and means for varying the position of the axis of rotation of said crank.

5. A power-transmitter comprising a power-shaft having a gear-wheel rigid therewith, a pinion meshing with the gear-wheel, means for adjusting the pinion while so meshed, a driven shaft, an oscillatory clutch on the driven shaft, pivoted levers connecting the clutch with the pinion, and a guide for the pivot of the said levers.

6. A power-transmitter comprising a driven shaft, oppositely-actuated clutches thereon for alternately engaging it, toggle-levers for actuating said clutches, a guide for the pivot of said levers, a power-shaft, a crank driven by said power-shaft, means for adjusting the position of the axis of rotation of said crank and a link connecting the said pivot of the toggle-levers with the crank.

7. A power-transmitter comprising a shaft, driven clutch members thereon, oppositely-actuated driving clutch members, clutch-rolls inserted between the clutch members, a spider having means controlling said clutch-rolls, and means for adjusting said spider to simultaneously vary the positions of the rolls of both of the oppositely-actuated clutches to start, stop, or reverse the shaft.

8. A power-transmitting mechanism comprising a shaft, driven clutch members thereon, oscillatory alternately-acting driving clutch members, there being double wedge-shaped cavities between the said driving and the said driven clutch members, two independent sets of clutch-rolls in said cavities, and means for simultaneously shifting both of said sets of clutch-rolls in said cavities.

9. A power-transmitting mechanism comprising a shaft, driven clutch members thereon, oscillatory alternately-acting driving clutch members, there being double wedge-shaped cavities between the said driving and the said driven clutch members, two independent sets of clutch-rolls in said cavities, and yielding means for simultaneously shifting both of said sets of clutch-rolls in said cavities.

10. A power-transmitting mechanism comprising a shaft, driven clutch members thereon, oscillatory alternately-acting driving clutch members, there being double wedge-shaped cavities between the said driving and the said driven clutch members, two independent sets of clutch-rolls in said cavities, a spider, having yielding means for shifting the said rolls of both sets, and means for adjusting the spider.

11. A power-transmitting mechanism comprising a shaft, a driven clutch member thereon, a driving clutch member, there being wedge-shaped cavities between said clutch members, independent clutch-rolls in said cavities, and an independent yielding device for each clutch-roll to vary its position.

12. A power-transmitting mechanism comprising a shaft, a driven clutch member thereon, a driving clutch member, there being wedge-shaped cavities between said clutch members, independent clutch-rolls in said cavities, an independent device controlling the movement of each roll, and a spider, yieldingly connected to said devices, for operating them.

In testimony whereof I have signed my name to this specification, in the presence of two subscribing witnesses, this 3d day of April, A. D. 1897.

GEORGE J. ALTHAM.

Witnesses:
A. D. HARRISON,
P. W. PEZZETTI.